United States Patent
Renner et al.

(10) Patent No.: US 7,453,525 B2
(45) Date of Patent: Nov. 18, 2008

(54) MOTION DETECTOR FOR A VIDEO DISPLAY SYSTEM

(75) Inventors: Karl Renner, Dallas, TX (US); Weider Peter Chang, Hurst, TX (US); Ramesh M. Chandrasekaran, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 391 days.

(21) Appl. No.: 11/135,799

(22) Filed: May 24, 2005

(65) Prior Publication Data

US 2006/0268179 A1 Nov. 30, 2006

(51) Int. Cl.
*H04N 9/78* (2006.01)
*H04N 5/14* (2006.01)

(52) U.S. Cl. .................. 348/702; 348/701; 348/666; 348/669

(58) Field of Classification Search ......... 348/699–702, 348/663–670
See application file for complete search history.

(56) References Cited

U.S. PATENT DOCUMENTS

| | | | |
|---|---|---|---|
| 4,179,705 A | 12/1979 | Faroudja | |
| 4,786,963 A | 11/1988 | McNeely et al. | |
| 4,864,389 A | 9/1989 | Faroudja et al. | |
| 5,161,006 A | 11/1992 | Monta et al. | |
| 5,218,435 A | 6/1993 | Lim et al. | |
| 5,430,500 A * | 7/1995 | Hoshino et al. | 348/701 |
| 5,469,227 A * | 11/1995 | Misker et al. | 348/702 |
| 5,523,850 A | 6/1996 | Kanda et al. | |
| 5,526,060 A | 6/1996 | Raby | |
| 5,926,220 A | 7/1999 | Linzer | |
| 5,990,978 A * | 11/1999 | Kim et al. | 348/663 |
| 5,990,987 A | 11/1999 | Kim et al. | |
| 6,055,024 A | 4/2000 | DiMeo et al. | |
| 6,459,457 B1 | 10/2002 | Renner et al. | |
| 6,774,954 B1 | 8/2004 | Lee | |
| 2004/0174464 A1 | 9/2004 | MacInnis et al. | |

FOREIGN PATENT DOCUMENTS

GB 2280079 A * 1/1995

OTHER PUBLICATIONS

Masafumi Yugami, et al., "*EDTV with Scan-Line Video Processor*", IEEE Transactions on Consumer Electronics, vol. 38, No. 3, Aug. 1992, pp. 553-562.
Chang, et al., "*Systems and Methods for Separating Luma and Chroma Information in a Composite Video Signal*", patent application being filed on the same day as the instant application.

\* cited by examiner

*Primary Examiner*—M. Lee
(74) *Attorney, Agent, or Firm*—Mirna Abyad; Wade J. Brady, III; Frederick J. Telecky, Jr.

(57) ABSTRACT

Systems and methods are provided for detecting motion within a composite video signal. A first chroma difference element compares an in-phase chroma component of the composite video signal to a delayed representation of the in-phase chroma component to produce a first chroma difference value for a given pixel. A second chroma difference element compares a quadrature chroma component of the composite video signal to a delayed representation of the quadrature chroma component to produce a second chroma difference value for the pixel. A parameter mapping component maps the first and second difference values to respective first and second motion parameters that indicates the degree of change in the chroma properties of the pixel. A parameter selector determines a composite motion parameter for the pixel from the first and second motion parameters.

20 Claims, 4 Drawing Sheets

MOTION DETECTOR FOR A VIDEO DISPLAY SYSTEM

TECHNICAL FIELD

The present invention relates generally to electrical circuits, and more particularly to systems and methods for detecting motion in a composite video signal.

BACKGROUND

A video display operates by displaying video images in response to a composite video signal received from a video source. The composite video signal comprises both luminance (luma) and chrominance (chroma) information. The luma portion contains the brightness, or black-and-white information for a given series of pixels, and the chroma portion contains the color information for the series of pixels. There are several standards for video signals commonly in use today, one being the National Television Standards Committee (NTSC), which is used in the United States and Japan. In NTSC, the chroma portion of a composite signal shifts in phase by one hundred eighty degrees between corresponding pixels on consecutive lines and frames. Another standard for video signals is Phase Alternating Lines (PAL), which is used in Europe. In PAL, the chroma component of the composite signal shifts in phase by approximately 270 degrees from line to line.

A number of functions in a video display rely on the accurate detection of motion within the signal, such as noise reduction and deinterlacing. Another application of motion detection is the separation of luma and chroma information within a signal. In some video transmission standards, chroma information within a composite video signal can be carried within the same frequency band as luma information. For example, in the NTSC standard, the chroma signal is added to the composite video signal by superimposing a sine wave onto the standard black and white (luma) signal. After the horizontal sync pulse, several cycles of the sine wave are added as a color burst. Following these cycles, a phase shift in the chrominance signal indicates the color to display. The amplitude of the signal determines the saturation.

The chroma signal is separated out of the composite video signal and decoded, along with the normal intensity signal, to determine the color content of the input signal. False color can be created when portions of the luma signal intrude into or near a frequency band associated with the chroma subcarrier. Dot crawl can occur when portions of the chroma signal intrude into the portion of the frequency band associated with the luma signal. The intruding signal can be mitigated with better accuracy by comb filtering the signal across three dimensions, but only if there is little or no motion in the video during this time. Accordingly, increasing the accuracy of motion detection across frames can allow for a significant reduction in color artifacts within a video signal.

SUMMARY

In accordance with an aspect of the present invention, a motion detection system is provided for detecting motion within a composite video signal. A first chroma difference element compares an in-phase baseband chroma component of the composite video signal to a delayed representation of the in-phase chroma component to produce a first chroma difference value for a given pixel. A second chroma difference element compares a quadrature baseband chroma component of the composite video signal to a delayed representation of the quadrature chroma component to produce a second chroma difference value for the pixel. A parameter mapping component maps the first and second difference values to respective first and second motion parameters that indicates the degree of change in the chroma properties of the pixel. A parameter selector determines a composite motion parameter for the pixel from the first and second motion parameters.

In accordance with another aspect of the present invention, a luma-chroma separation system includes a demodulator system that demodulates the composite video signal to produce a baseband chroma signal and at least one delayed baseband chroma signal. A given baseband chroma signal contains chroma information for an associated one of a plurality of video frames comprising the composite signal. A motion detector compares the baseband chroma signal and the at least one delayed baseband chroma signals and generates a motion parameter reflecting the amount of motion between two frames from the plurality of frames comprising the composite signal. A two-dimensional (2-D) chroma path produces a 2-D chroma signal. A three-dimensional (3-D) chroma path produces a 3-D chroma signal. A chroma mixer combines the 2-D chroma signal and the 3-D chroma signal according to the generated motion parameter.

In accordance with yet another aspect of the present invention, a method is provided for detecting motion within a composite video signal. An original composite video signal, representing a first frame, is delayed by at least one frame to produce a delayed composite signal, representing a second frame. The original composite video signal and the delayed composite signal are demodulated to produce respective baseband chroma signals. The baseband chroma signals for a given pixel are compared to quantify the motion in a chroma portion of the composite video signal as a first motion parameter representing the pixel. It will be appreciated that information representing more than two frames can be utilized in generating the motion parameter.

BRIEF DESCRIPTION OF THE DRAWINGS

The foregoing and other aspects of the present invention will become apparent to those skilled in the art to which the present invention relates upon reading the following description with reference to the accompanying drawings.

DETAILED DESCRIPTION

Figure 1:
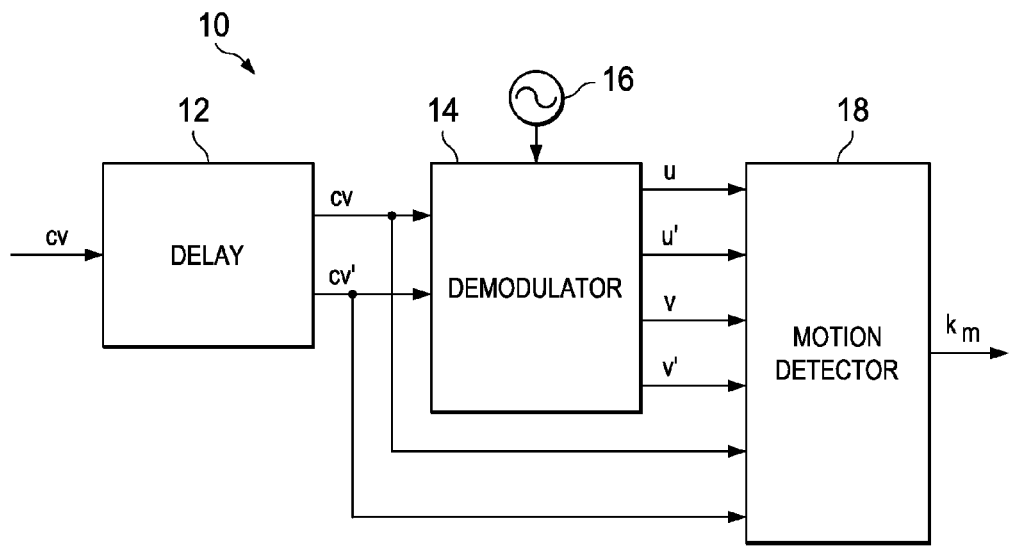
FIG. 1 illustrates a system for detecting motion between frames in a composite video signal in accordance with an aspect of the present invention.

FIG. 1 illustrates a system 10 for detecting motion between frames in a composite video signal, cv, in accordance with an aspect of the present invention. The composite video signal, which comprises a series of video frames, can be provided to a delay element 12 that can delay the signal by one or more frames to produce one or more delayed signals, cv', representing corresponding video data for subsequent frames with the composite signal. For example, the delay element 12 can provide a series of delays to the signal to produce one or more delayed composite signals representing corresponding video data for subsequent frames.

The composite video signal and the delayed composite signals are then provided to a demodulator 14, which demodulates each of the signals to provide a respective baseband chroma signal based on reference signals provided by an oscillator 16. For example, the oscillator 16 can provide sine and cosine reference signals that allow in-phase and quadrature components comprising the baseband chroma signal to be extracted from each composite signal. The remainder of each signal can be eliminated by one or more low pass filters associated with the demodulator 14. Accordingly, the demodulator output can comprise a first baseband chroma signal, comprising a first set of chroma components, u and v, and at least one delayed baseband chroma signal, comprising a second, delayed set of chroma components, u' and v', with each signal representing a given frame within the composite video signal.

The chroma component sets are then provided to a motion detector 18. The motion detector 18 can also be provided with the composite video signal, cv, and the one or more delayed composite signal, cv'. Two or more luma components, corresponding to the chroma component sets, can be derived from the composite video signals. The motion detector 18 compares the chroma component sets at a baseband chroma comparator to quantify the degree of motion experienced in the video signal across the video frames represented by the chroma component sets. The output of the motion detector is a motion parameter, $k_m$, that can be used to control one or more components of a video display system that are sensitive to motion within the signal. It will be appreciated that the motion detector 18 can utilize other inputs as well in quantifying the interframe motion, such as the luma components derived from the composite video signal to generate the motion parameter, $k_m$.

Figure 2:
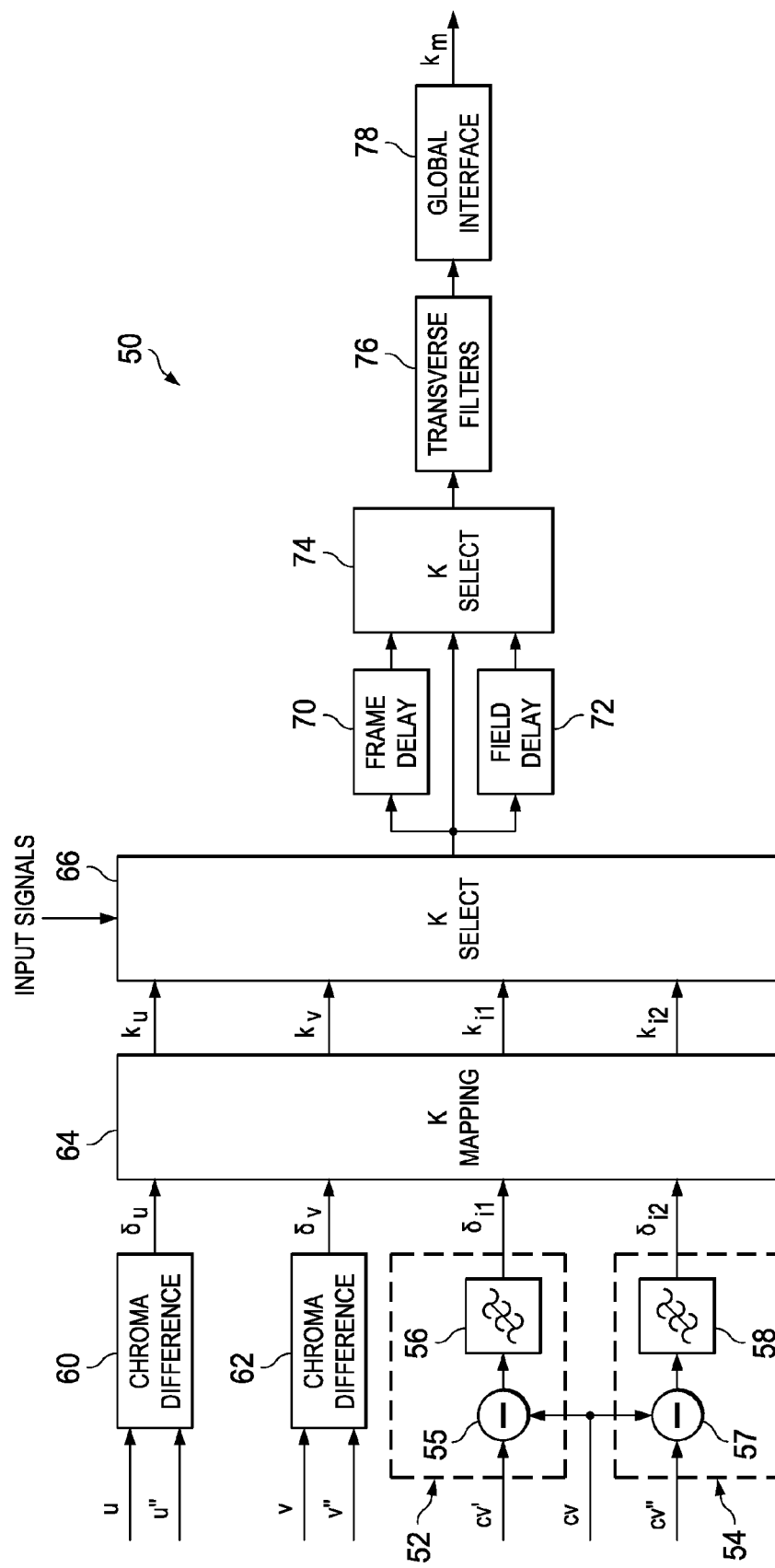
FIG. 2 illustrates a motion detector that detects and quantifies differences between video frames in accordance with an aspect of the present invention.

FIG. 2 illustrates a motion detector 50 that detects and quantifies differences between video frames. In accordance with an aspect of the present invention, the motion detector 50 receives baseband chroma components, u and v, as well as delayed versions of the baseband chroma components, u" and v". Since the chroma signal inverts completely with each successive frame, the delayed chroma signals can represent a two frame delay in their respective baseband signals to provide signals equivalent in phase for comparison.

The motion detector 50 can also receive the composite video signal, cv, and one or more delayed versions of the composite signal, cv' and cv". In the illustrated embodiment, the delayed signals, cv' and cv", represent a delay of one frame and two frames respectively. Each of the delayed signals are provided to respective luma difference generators 52 and 54, that calculate difference values, $\delta_{l1}$, and $\delta_{l2}$, for each pixel of the composite signal according to the difference between the composite signal and the provided delayed signals. For example, the difference generators 56 and 58 can determine the absolute difference between the amplitude values associated with the two signals at a time associated with a given pixel.

In the illustrated implementation, the composite video signal, cv, and the first delayed composite video signal, cv', are provided to a first luma difference generator 52. A difference between the two signals is determined at a firs difference element 55. The determined difference is then provided to a first filter assembly 56, which is configured to remove any remaining chroma information from the determined difference to produce a first luma difference value, $\delta_{l1}$. Similarly, the composite video signal, cv, and the second delayed composite video signal, cv", are provided to a second luma difference generator 54. A difference between the two signals is determined at a second difference element 57. The determined difference is then provided to a second filter assembly 58, which removes any chroma information from the determined difference to produce a second luma difference value, $\delta_{l2}$.

Each chroma component and its respective delayed signal is provided to respective chroma difference generators 60 and 62 that calculate difference values, $\delta_u$ and $\delta_v$, for each pixel of the composite component according to the difference between the chroma components and their associated delayed signal. Like the luma difference generators 56 and 58, the chroma difference generators 60 and 62 can determine the absolute difference between the amplitude values associated with a chroma component and its delayed representation at a time associated with a given pixel. Each calculated difference value is provided to a parameter mapping component 64.

The mapping component 64 maps each difference value to respective motion parameters, $k_u$, $k_v$, $k_{l1}$, $k_{l2}$, for the evaluated pixel. In the illustrated implementation, this mapping comprises two phases, a coring phase and a gain phase. In the coring phase, a threshold value is subtracted from each difference value. It will be appreciated that the applied threshold value can vary for each difference signal, representing a predetermined tolerance for noise within the each chroma and composite input.

In the gain phase, the difference value is converted into a motion parameter according to a predetermined function for each signal. Generally, the output of each function will be limited to a desired range, with the one end of the range representing little or no motion and the other end of the range representing a high degree of motion for the evaluated pixel. For example, in the illustrated implementation, a linear function is used for each signal, with the output of each functions varying on a range from zero, representing little motion, to sixteen. In an exemplary embodiment, the threshold values and various parameters defining the functions for each signal can be programmable as to allow structurally similar motion detectors to be used for a variety of applications.

Figure 3:
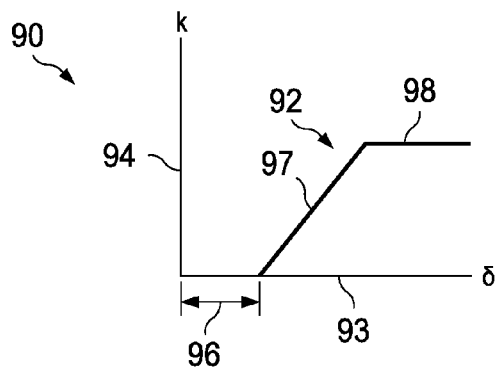
FIG. 3 illustrates an exemplary mapping function for a motion detector in accordance of the present invention.

FIG. 3 illustrates an exemplary mapping function 90 in accordance of the present invention. The mapping function 90 is represented as a line graph 92 mapped on a horizontal axis 93, representing a determined difference value between an input signal and a delayed version of an input signal, and a vertical axis 94, representing the value of the motion parameter. The coring phase 96 is represented by the x-intercept of the function, such that there is no gain in the motion parameter until a threshold difference value is reached. The motion parameter then increases linearly with the difference value during a linear phase 97. Once the motion parameter reaches a maximum value, the function reaches a saturation phase 98, where the motion parameter is retained at the maximum value regardless of an increase in difference. Accordingly, for any possible difference value within the signal, a motion parameter can be assigned to the difference value that roughly represents the signal motion indicated by the difference value.

The motion parameters are provided to a first parameter selector 66. The first parameter selector 66 generates a motion parameter from the provided motion parameters and, optionally, one or more characteristics of the signal. For example, the first parameter selector 66 can average or select between the provided values to determine a composite motion parameter, $k_m$, for the pixel. In an exemplary implementation, the first parameter selector 66 selects the maximum value of the four provided motion parameters. The first parameter selector 66 can include control logic, such that the determination of the composite motion parameter can be influenced by additional characteristics of the signal. For example, when a signal is determined at the control particularly jittery, the pixel can be assigned a default motion parameter to ensure that a two-dimensional comb filter is utilized. It will be appreciated that the first parameter selector 66 can be made programmable such that the control logic and the logic behind the averaging of the parameter can be adapted to a given application. For example, the first parameter selector 66 can be toggled between a mode in which the input motion parameters are averaged and a mode in which a maximum parameter is accepted.

The composite motion parameter is provided to a frame delay 70 and a field (e.g., half frame) delay 72 for comparison. These delays can be provided by a random access memory (RAM), (e.g., Synchronous Dynamic Random Access Memory) through a memory interface. These values can then be combined at a second parameter selector 74 to provide a second composite motion parameter. Like the first parameter selector 66, the second parameter selector 74 can combine the parameter values in any reasonable fashion, such as a weighted linear combination of the parameters or a select of a maximum value. The second parameter selector 74 can also be made programmable, such that the logic behind the generation of the second composite parameter can be adapted for a given application.

The second composite motion parameter is provided to a transverse filter assembly 76. The transverse filter assembly comprises a plurality of filters that smooth the motion parameters for the pixels both vertically and horizontally within the frame. In one example, the transverse filter uses an averaging technique, such that the value of the motion parameter for a given pixel is affected to some degree by its surrounding pixels. The averaging can be controlled by filter coefficients associated with the filter, as well as an associated filter width and height. Alternatively, the transverse filtering can comprise a maximum filter, in which all pixels with a given field, defined by a width and height of the filter, are assigned a motion parameter having a value equal to a maximum value of the motion parameters within the field. In accordance with an aspect of the present invention, the transverse filter assembly 76 can be made programmable, such that filter characteristics such as the type of filter, the filter width and height, and any associated filter parameters can be altered for a desired application.

The filtered pixel values are then provided to a global interface 78. The global interface 78 communicates with other processing components associated with a given system both to improve the accuracy of the motion detection and to improve the performance of the other processing components within the system. For example, the global interface 78 can receive data about noise within the signal from one or more other components and adjust the motion parameter for a pixel based upon this data. This adjusted value, $k_m$, provides a final motion parameter for the motion detector 50, indicative of the total amount of motion associated with the evaluated pixel. The final motion parameter can be provided to other components within the system in which the amount of motion within the composite video signal is important for decision making. Similarly, the global interface 78 can include control logic that evaluates the generated motion detection values and adapts parameters (e.g., comb filter parameters) for other components within the system. It will be appreciated that the control logic within the global interface 78 can be made programmable to allow for adaptation of the motion detector 50 to multiple applications.

Figure 4:
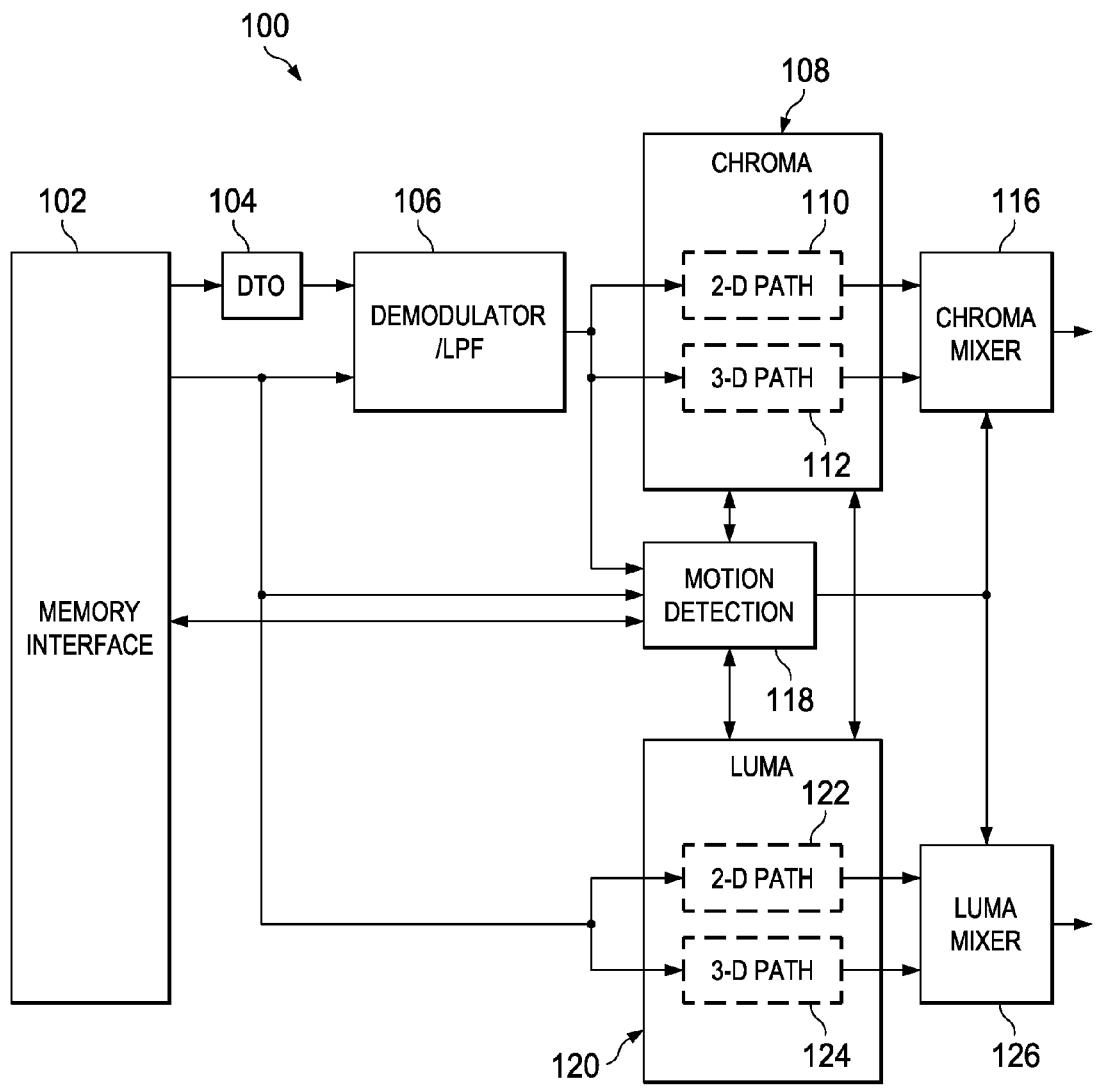
FIG. 4 illustrates an exemplary implementation of a motion detector in accordance with an aspect of the present invention in a luma-chroma separation system.

FIG. 4 illustrates an exemplary use of a motion detector in accordance with an aspect of the present invention in a luma-chroma separation system 100. It will be appreciated, however, that a motion detector in accordance with the present invention can be utilized for a variety of functions within a video display system, including noise reduction and deinterlacing. In accordance with an aspect of the invention, the luma-chroma separation system 100 incorporates a memory interface 102 that facilitates communication between signals stored in a memory (not shown) and the other components of the luma-chroma separation system 100. The memory interface 102 provides a reference signal to a discrete time oscillator (DTO) 104. The DTO 104 provides sine and cosine reference signals, representing in-phase and quadrature components of the chroma carrier signal, to a demodulator system 106.

A composite video signal is then provided to the demodulator system 106, and a set of baseband chroma signals are extracted. In accordance with an aspect of the present invention, the demodulator system 106 can be provided with delayed versions of the composite signal to produce sets of delayed baseband chroma signals representing additional frames in the video input. All other components can be filtered out by a low pass filter within the demodulator system 106. The extracted signal set can then be provided to a chroma assembly 108, comprising a 2-D filter path 110 and a 3-D filter path 112.

The 2-D filter path 108 reduces extraneous luma information within the chroma signal set by combining lines of video within a given video frame of the baseband chroma signal. Each line output from the 2-D comb filter 108 is a linear combination of two or more lines, weighted according to a set of filter coefficients. Similarly, the 3-D filter path 110 reduces extraneous luma information within the chroma signal set by combining frames, for example consecutive or temporally proximate frames, that contain similar information. Each frame output from the 3-D filter path 110 is a linear combination of two or more frames within the video signal, weighted according to a set of filter coefficients.

The outputs of the 2-D and 3-D paths 110 and 112 are provided to a chroma mixer 116. The chroma mixer 116 combines the 2-D or the 3-D chroma output for each pixel of video data according to a motion parameter provided by a motion detector 118 in accordance with an aspect of the present invention. In an exemplary implementation, the output of the chroma mixer 116 is a weighted average of the 2-D and the 3-D chroma signals, such that:

$$C_{out} = \frac{k}{k_{max}} C_{2-D} + \left(1 - \frac{k}{k_{max}}\right) C_{3-D} \qquad \text{Eq. 1}$$

where a k is the motion parameter, $k_{max}$ is a maximum value associated with the motion parameter, and $C_{2-D}$, $C_{3-D}$, and $C_{out}$ are the 2-D, 3-D, and the output chroma values, respectively.

A luma assembly 120 comprises a 2-D luma path 122 and 3-D luma path 124 for generating, respectively, a 2-D luma signal and a 3-D luma signal. The luma signal from each path can be generated in a number of ways. For example, information from the chroma assembly 108 can be utilized to remove chroma information from the composite signal. Alternatively, the chroma information can be removed from the composite video signal via filtering across lines or frames in the composite signal. The outputs of the 2-D and 3-D luma paths 122 and 124 are provided to a luma mixer 126. The luma mixer 126 combines the 2-D or the 3-D luma output for each pixel of video data according to the motion parameter provided by the motion detector. For example, the output of the luma mixer 126 can be a weighted average of the 2-D and the 3-D luma signals, such that:

$$L_{out} = \frac{k}{k_{max}} L_{2-D} + \left(1 - \frac{k}{k_{max}}\right) L_{3-D} \quad \text{Eq. 2}$$

where a k is the motion parameter, $k_{max}$ is a maximum value associated with the motion parameter, and $L_{2-D}$, $L_{3-D}$, and $L_{out}$ are the 2-D, 3-D, and the output luma values, respectively In accordance with aspect of the present invention, the motion detector 118 and the luma and chroma assemblies 120 and 108 can include control logic (not shown) that allows the various components 108, 118, and 120 for communicate between one another concerning characteristics of the signal. For example, control logic within the 2-D path 110 of the chroma assembly 108 and the 2-D path 122 of the luma assembly 120 can notify the motion detector 118 of any noise detected within the signal during filtering. Similarly, the motion detector 118 can provide configuration data to the luma and chroma assemblies 120 and 108 based on the determined motion characteristics of the signal. For example, the motion detector 118 can adjust one or more filter coefficients associated with the 3-D chroma path 112 according to the motion detected within the signal. When the signal is transitioning between scenes, the comb filter can be narrowed, to two frames from three frames, for example, at the point of transition.

Figure 5:
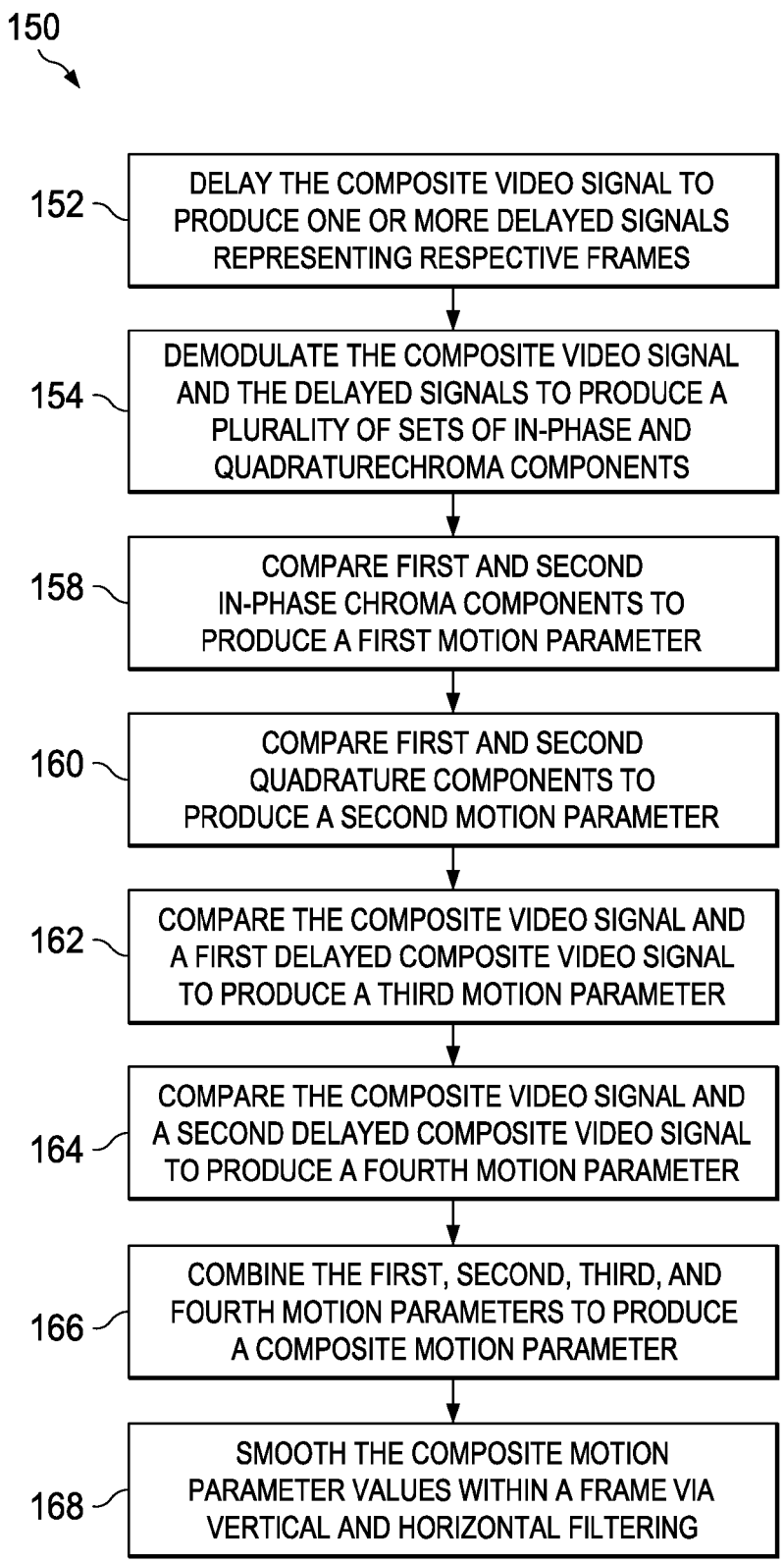
FIG. 5 illustrates a methodology for detecting motion in a composite video signal in accordance with an aspect of the present invention.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates an exemplary methodology 150 for detecting motion in a composite video signal. At 152, an original composite video signal, representing a first frame, is delayed to produce one or more delayed composite signals, representing respective frames. At 154, both the original composite video signal and the one or more delayed composite signals are demodulated to produce respective sets of in-phase and quadrature baseband chroma components for a given pixel.

A first in-phase component, representing the first frame, and a second in-phase component, representing a second frame, are compared at 158 to quantify the motion in a chroma portion of the composite video signal as a first motion parameter representing the pixel. At 160, a first quadrature component, representing the first frame, and a second quadrature component, representing the second frame, are compared to quantify the motion in the chroma portion of the composite video signal as a second motion parameter representing the pixel. The composite video signal and a first delayed composite video signal, representing, for example, the second frame, are compared at 162 to quantify the motion in a luma portion of the composite video signal as a third motion parameter for the pixel. For example, a difference between the two signals can be determined, and the chroma information within the determined difference can be filtered out to produce a luma parameter.

At 164, the composite video signal and a second delayed composite video signal, representing, for example, a third frame, are compared to quantify the motion in the luma portion of the composite video signal as a fourth motion parameter for the pixel. The first, second, third, and fourth motion parameters are then combined into a composite motion parameter at 166. For example, a maximum or average of the motion parameters can be determined to produce the composite motion parameter. Once composite motion parameters have been developed for a sufficient number of pixels in a given frame, the motion parameter values can be filtered horizontally and vertically within the frame at 168 to smooth the transitions between motion parameter values within the frame. The filtered motion pixel values can then be provided as a system output.

Figure 6:
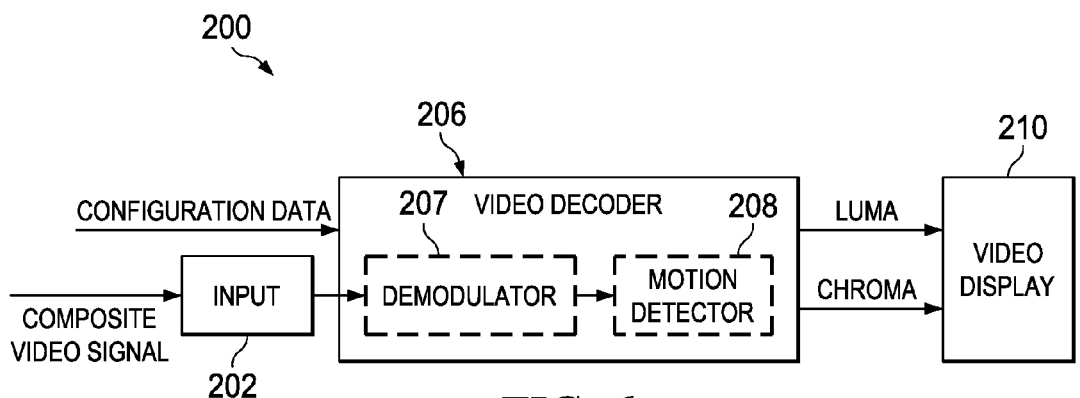
FIG. 6 illustrates a functional block diagram of a video display system in accordance with an aspect of the present invention.

FIG. 6 illustrates a functional block diagram of a video display system 200. It will be appreciated that the illustrated video display system is provided solely for the purpose of example, and that a luma-chroma separation system in accordance with one or more aspects of the present invention can be used in a variety of video display systems. In the illustrated implementation, a composite video signal is applied to an input terminal 202 and supplied to a video decoder 204.

The video decoder 204 can include a demodulator 205 that produces a plurality of baseband chroma signals representing respective video frames from the composite video signal. These chroma signals are then provided to a motion detector 206 that compares the chroma signals representing the various frames and quantifies the interframe motion within the composite video signal as a motion parameter. This motion parameter can be provided as control data to one or more other components within the video display system 200 that may be sensitive to motion within the composite video signal. Using the motion detector 206 output, the video decoder 204 can process the composite video signal to provide a decoded signal in a desired format (e.g., RGB or YCbCr) to a video display 210.

In accordance with an aspect of the present invention, the motion detector 208 can include one or more programmable components responsive to configuration data from an operator. For example, one or more transverse filters associated with the motion detector 206 can be programmed by an operator to change the nature of the filter, any filter coefficients associated with the filters, and the dimensions of the filter. Similarly, the motion detector 208 can include internal control logic that adjusts the motion detector output according to one or more characteristics of the input signal. For example, the motion detector 208 can adjust its output to favor 2-D processing of the video signal when signal jitter, caused by synchronization errors between the frames, is detected. This control logic can be adjusted to adapt the video decoder 204 to a desired application. In accordance of an aspect of the invention, a human operator can evaluate the performance of the video display system 200, and reconfigure the motion detector 206 to improve the appearance of the displayed video. Accordingly, a standard motion detection component 206 can be utilized for a number of applications, with appropriate configuration data being provided to optimize its performance for a given application.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A motion detection system for detecting motion within a composite video signal, comprising:
    a first chroma difference element that compares an in-phase baseband chroma component of the composite video signal to a delayed representation of the in-phase chroma component to produce a first chroma difference value for a given pixel;
    a second chroma difference element that compares a baseband quadrature chroma component of the composite video signal to a delayed representation of the quadrature chroma component to produce a second chroma difference value for the pixel;
    a parameter mapping component that maps the first and second difference values to respective first and second motion parameters that indicates the degree of change in the chroma properties of the pixel; and
    a parameter selector that determines a composite motion parameter for the pixel from the first and second motion parameters.

2. The system of claim 1, further comprising at least one luma difference element, a given luma difference element being operative to compare a luma component of the composite video signal to a delayed representation of the luma component to produce at least one luma difference value for the pixel, the parameter selector determining the composite motion parameter according to the first and second motion parameters and the at least one luma parameter.

3. The system of claim 2, the parameter selector comprising a maximum filter that selects a largest motion parameter from the first motion parameter,
    the second motion parameter, and the at least one luma parameter to determine the composite motion parameter.

4. The system of claim 2, further comprising:
    a delay component that stores a frame delayed composite motion parameter, having a delay of one frame, and a field delayed composite motion parameter, having a delay of one half of a frame; and
    a second parameter selector that generates a new composite motion parameter from the composite motion parameter, the field delayed composite motion parameter, and the frame delayed composite motion parameter.

5. The system of claim 1, the parameter selector including control logic that evaluates at least one characteristic of the quadrature and in-phase baseband chroma components, the parameter selector being operative to adjust the composite motion parameter based upon the at least one characteristic.

6. The system of claim 5, the control logic having a plurality of parameters that are programmable to allow the motion detector to be adapted to a given application.

7. The system of claim 1, the system further comprising a transverse filter assembly that filters the composite motion parameter for a given pixel based upon the values of composite motion parameters from pixels surrounding the pixel within a given frame.

8. The system of claim 7, the transverse filter assembly having a plurality of associated parameters, the plurality of programmable parameters being programmable by an operator to adapt the motion detector to a given application.

9. The system of claim 1, the system further comprising a global inter-face that adjusts the value of the composite motion parameter according to data received from at least one processing component external to the motion detector.

10. A luma-chroma separation system, comprising:
    a demodulator system that demodulates the composite video signal to produce a baseband chroma signal and at least one delayed baseband chroma signal, a given baseband chroma signal containing chroma information for an associated one of a plurality of video frames comprising the composite signal;
    a motion detector that compares the at least one baseband chroma signal and the at least one delayed baseband chroma signals and generates a motion parameter reflecting the amount of motion between two frames from the plurality of frames comprising the composite signal;
    a two-dimensional (2-D) chroma path that produces a 2-D chroma signal; a three-dimensional (3-D) chroma path that produces a 3-D chroma signal; and
    a chroma mixer that combines the 2-D chroma signal and the 3-D chroma signal according to the generated motion parameter.

11. The system of claim 10, wherein the chroma mixer produces a weighted average of the 2-D and the 3-D chroma signals, a set of weights associated with the weighted average being generated from the motion parameter.

12. The system of claim 10, the system further comprising:
    a 2-D luma path that produces a 2-D luma signal;
    a 3-D luma path that produces a 3-D luma signal; and
    a luma mixer that combines the 2-D luma signal and the 3-D luma signal according to the generated motion parameter.

13. The system of claim 10, the 3-D chroma path comprising a 3-D comb filter, the motion detector providing a set of filter coefficients according to determined motion characteristics of the signal.

14. The system of claim 10, the 2-D chroma path providing control data to the motion detector, the motion detector utilizing the control data to generate the motion parameter.

15. A video display system comprising the luma-chroma separation system of claim 10.

16. A method for detecting motion within a composite video signal, comprising:
    delaying an original composite video signal by at least one frame, representing a first frame, to produce a first delayed composite signal, representing a second frame;
    demodulating the original composite video signal to produce first and second baseband components;
    demodulating the delayed composite signal to produce third and fourth baseband chroma components;
    comparing the first and third baseband chroma components for a given pixel to quantify the motion in a chroma portion of the composite video signal as a first motion parameter representing the pixel;
    comparing the second and fourth baseband chroma signals for a given pixel to quantify the motion in the chroma portion of the composite video signal as a second motion parameter representing the pixel; and determining the motion within the composite video signal from the first and second motion parameter.

17. The method of claim 16, further comprising:
delaying the first composite video signal by one frame to produce a second delayed composite video signal, representing a third frame;
comparing the original composite video signal and the first delayed composite video signal for the pixel to quantify the motion in a luma portion of the composite video signal as a third motion parameter for the pixel; and
comparing the original composite video signal and the second delayed composite video signal for the pixel to quantify the motion in a luma portion of the composite video signal as a fourth motion parameter for the pixel.

18. The method of claim 17, further comprising generating a composite motion parameter from the first, second, third, and fourth motion parameters.

19. The method of claim 18, further comprising adjusting the composite motion parameter according to detected signal jitter within at least one of the first, second, third, and fourth baseband chroma components.

20. The method of claim 18, further comprising:
generating a composite motion parameter for each of a plurality of pixels within a video frame; and
smoothing the values of the motion parameters vertically and horizontally within the video frame.

* * * * *